2

United States Patent Office 3,452,092
Patented June 24, 1969

3,452,092
N-SUBSTITUTED o-BENZOYLBENZAMIDE
Francis J. Petracek, Canoga Park, Calif., assignor to Rexall Drug and Chemical Company, Los Angeles, Calif., a corporation of Delaware
No Drawing. Filed June 17, 1965, Ser. No. 464,828
Int. Cl. C07c *103/26*
U.S. Cl. 260—558
2 Claims This invention relates to compositions of matter classified in the art of chemistry as substituted o-benzoylbenzamides.

The invention sought to be patented is described as residing in the concept of a chemical compound having a molecular structure in which the nitrogen atom of the o-benzoylbenzamide nucleus bears a hydroxy-lower alkyl radical, and the hereinafter described equivalents thereof.

As used throughout the application the terms "lower alkyl" and "lower alkoxy" embrace both straight and branched chain alkyl and alkoxy radicals, respectively, containing from 1 to 6 carbon atoms, for example, methyl, ethyl, n-propyl, isopropyl, n-butyl, tert-butyl, n-amyl, sec-amyl, n-hexyl, 2-ethylbutyl, 2,3-dimethylbutyl and the like in the case of lower alkyl and methoxy, ethoxy, propoxy, isopropoxy, n-butoxy, tert-butoxy, n-hexyloxy in the case of lower alkoxy; the term "lower alkylene" embraces both straight and branched alkylene radicals containing from 2 to 6 carbon atoms, for example ethylene, propylene, n-butylene, 2-ethylbutylene, 2,3-dimethylbutylene, 2-methylpropylene, 2-ethylpropylene, n-hexylene and the like; the term "halo" embraces chloro, bromo, iodo and fluoro; and the term "hydroxy-lower alkyl" embraces a lower adkyl radical with 2 to 6 carbon atoms having a hydroxyl radical substituted at any position.

The tangible embodiments of this invention possess the inherent general physical properties of being solid crystalline materials. Infra-red spectral data, elemental analysis and the aforementioned physical characteristics, taken together with the nature of the starting material and mode of synthesis, positively confirm the structure of the compounds sought to be patented.

The tangible embodiments of this invention possess the inherent applied use characteristics of having significant pharmacological activity without adverse toxicity as anti-convulsant agents as determined by recognized and accepted pharmacological test procedures.

The manner and process of making and using the invention will now be generally described so as to enable one skilled in the art of chemistry to make and use the same as follows:

The reaction sequence leading to the preparation of the substituted o-benzoylbenzamides of this invention is set forth in the following reaction sequence:

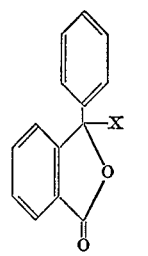

STARTING MATERIAL

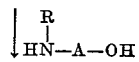

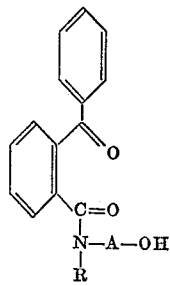

FINAL PRODUCT wherein R is hydrogen or lower alkyl, A is lower alkylene and X is halo.

The 3-halo-3-phenylphthalide starting material described in the reaction sequence depicted above is a known compound that is readily prepared as described by Yost and Burger [J. Org. Chem. 15: 1113 (1950)], through treatment of o-benzoylbenzoic acid with a thionyl halide.

Starting materials wherein either one or both of the benzene rings bear one or more lower alkyl, lower alkoxy, halo or trifluoromethyl radicals are the full equivalents in the above reaction sequence to the specific starting material therein described, and are prepared by the same procedure disclosed in the Yost and Burger paper referred to hereinabove. Their use in the above reaction sequence results in the preparation of products wherein the benzene rings bear lower alkyl, lower alkoxy, halo or trifluoromethyl radicals at the same position as in the starting material, such products having the same utility as the specific products depicted in the reaction sequence and being included within the scope of this invention.

The 3-halo-3-phenylphthalide starting material is converted to the N-(hydroxy-lower-alkyl)-o-benzoylbenzamides which comprise the tangible embodiments of this invention by means of the well-known Schotten-Baumann reaction through treatment with an appropriate hydroxy-lower alkyl amine for example 2-hydroxyethylamine, 2-hydroxy propylamine, 3-hydroxypropylamine, 6-hydroxy-n-hexylamine, 3-hydroxy-n-butylamine and the like, or the N-mono-lower alkyl substituted derivatives of such hydroxy-lower alkyl amines which are the full equivalents thereof in the reaction, in the presence of a dilute base and in the presence of a nonreactive inert solvent, such as, for example, methylene chloride, at a temperature up to the reflux temperature of the solvent used. Alternately, the hydroxy-lower alkyl amine can be present in a several-fold molar excess and thus serve both as reactant and solvent in the reaction. The product of the reaction is then recovered by conventional techniques of isolation and purification.

The tangible embodiments of this invention can be combined with conventional pharmaceutical diluents and carriers to provide such dosage forms as tablets, suspensions, solutions, suppositories and the like.

The best mode contemplated by the inventor for carrying out this invention will now be set forth as follows:

EXAMPLE

N-methyl-N-(2-hydroxyethyl)-o-benzoylbenzamide

3.-chloro-3-phenylphthalide (5 g., 0.02 mole) is placed into a flask containing methylene chloride (25 ml.) and a five-fold molar excess of N-methyl-2-aminoethanol is slowly added and the mixture is stirred for 1 hour at room temperature. The excess aminoalcohol is removed by extraction with 1 N hydrochloric acid. The mixture is then extracted with 1 N sodium hydroxide to remove any starting material that may have hydrolized. The methylene chloride solution remaining is dried and evaporated to an oil that solidifies upon standing. The product is recrystallized from benzene/petroleum ether in a yield of 4.7 g. (84%), M.P. 104°–106° C.

*Analysis.*—Calculated for $C_{17}H_{17}NO_3$: C, 72.06%; H, 6.05%; N, 4.94%. Found: C, 71.49%; H, 6.34%; N, 5.32%.

The subject matter which the applicant regards as his invention is particularly pointed out and distinctly claimed as follows:

I claim:
1. N-(hydroxy-lower alkyl)-o-benzoylbenzamide.
2. N-methyl-N-(2-hydroxyethyl)-o-benzoylbenzamide.

References Cited

UNITED STATES PATENTS 2,629,737  1953  Krimmel _____ 260—558

HENRY R. JILES, *Primary Examiner.*

HARRY I. MOATZ, *Assistant Examiner.*

U.S. Cl. X.R.

260—999